United States Patent

Schuler et al.

[11] Patent Number: 5,938,271
[45] Date of Patent: Aug. 17, 1999

[54] FOLDING ROOF ARRANGEMENT FOR A MOTOR VEHICLE HAVING A FOLDING COVER

[75] Inventors: Eckart Schuler, Sindelfingen; Karl-Heinz Kroboth, Ludwigsburg; Peer-Olaf Kober, Magstadt; Martin Guckel, Neuhausen; Thomas Graf, Sindelfingen, all of Germany

[73] Assignee: Daimler-Benz Aktiengesellschaft, Germany

[21] Appl. No.: 09/132,504

[22] Filed: Aug. 11, 1998

[30] Foreign Application Priority Data

Aug. 11, 1997 [DE] Germany .................. 197 34 671

[51] Int. Cl.⁶ ................................. B06J 7/12
[52] U.S. Cl. ............ 296/121; 296/107.12; 296/107.13; 296/107.15
[58] Field of Search .............. 296/107.09, 107.11, 296/107.12, 107.13, 107.14, 107.15, 121

[56] References Cited

U.S. PATENT DOCUMENTS

| | | | |
|---|---|---|---|
| 4,712,828 | 12/1987 | Albrecht | 296/121 |
| 4,840,419 | 6/1989 | Kolb | 296/108 |
| 5,042,869 | 8/1991 | Brin | 296/121 |
| 5,259,658 | 11/1993 | Koppenstein et al. | 296/107.12 |
| 5,269,586 | 12/1993 | Hahn et al. | 296/224 |
| 5,435,615 | 7/1995 | Schmitz | 296/121 |
| 5,499,855 | 3/1996 | Andres et al. | 296/121 |
| 5,636,894 | 6/1997 | Kinnanen | 296/107 |
| 5,839,778 | 11/1998 | Schaible et al. | 296/224 |

FOREIGN PATENT DOCUMENTS

| | | |
|---|---|---|
| 0 376 208 A2 | 7/1990 | European Pat. Off. . |
| 00823728 | 1/1938 | France ................. 296/121 |
| 37 18 093 A1 | 12/1988 | Germany . |
| 4326291 | 9/1994 | Germany ............. 296/121 |
| 195 01 997 A1 | 7/1995 | Germany . |
| 43 08 385 C2 | 8/1996 | Germany . |
| 2157360 | 10/1985 | United Kingdom ......... 296/121 |
| 2267063 | 11/1993 | United Kingdom ......... 296/121 |
| Wo 96/27509 | 9/1996 | WIPO . |

Primary Examiner—D. Glenn Dayoan
Assistant Examiner—Paul Chenevert
Attorney, Agent, or Firm—Evenson, McKeown, Edwards & Lenahan, P.L.L.C.

[57] ABSTRACT

A folding roof arrangement for a motor vehicle is provided with a folding cover whose forward end is fastened to a transversely extending roof cap which can be locked by way of locking members on the motor vehicle body when the roof is closed. The folding roof arrangement is provided with lateral folding top frames with which the roof cap is displaceably connected. The locking members have closing members which are arranged on the roof cap and which are applied to tensioning elements arranged on the motor vehicle body. The locking members displace the roof cap in the x-direction toward the front relative to the folding top frames for end position locking.

11 Claims, 1 Drawing Sheet

FOLDING ROOF ARRANGEMENT FOR A MOTOR VEHICLE HAVING A FOLDING COVER

BACKGROUND OF THE INVENTION

This application claims the priority of German application 197 34 671.5, filed Aug. 11, 1997, the disclosure of which is expressly incorporated by reference herein.

The present invention relates to a folding roof arrangement for a motor vehicle having a folding cover, and more particularly to an arrangement having a folding cover whose forward end is fastened to a transversely extending roof cap which can be locked on the motor vehicle body by way of locking members when the roof is closed, and having lateral folding top frames with which the roof cap is connected.

DE 43 08 385 C2 shows a folding roof arrangement for a motor vehicle which has a folding roof and a locking device for locking the front edge of the folding roof to the motor vehicle body when the folding roof is erected. The operation of the locking device is activated by a remotely mounted activating device via a cable control.

DE 37 18 093 A1 describes a folding top cover of a motor vehicle having a tensioning device which provides a tolerance compensation so that the folding top cover remains tensioned also in different positions of the folding top structure. For this purpose, a tensioning device is provided in the folding top structure.

DE 195 01 997 A1 shows a locking device for a folding top of an automobile which can be folded open. The locking parts are provided such that the final movement of the roof mechanism causes automatic locking.

SUMMARY OF THE INVENTION

An object of the present invention is to provide a folding roof arrangement which can be operated by low forces and it is nevertheless ensured that a sufficient fabric tensioning exists in the closed condition.

According to the present invention, this object has been achieved by providing that the roof cap is displaceably connected with the lateral folding top frames, and in that the locking members have closing members which are arranged on the roof cap and which are applied to tensioning elements arranged on the motor vehicle body and which displace the roof cap in the longitudinal direction of the vehicle (x-direction) toward the front relative to the lateral folding top frames into an end position for the locking.

The locking members according to the present invention with their associated tensioning elements achieve automatic tensioning of the folding cover during closing. One of the main advantages of the present invention is that, during the opening of the folding top after the release of the locking members and the resulting relaxation, the fabric tensioning of the folding cover is already non-existent with the release of the roof cap. Therefore, the folding cover does not, as was the case in the prior art, have to be pulled over a "dead center". In this manner, forces in the drive for the opening of the folding top can be reduced or, in critical cases, only this will permit a fully automatic opening of the folding top.

By way of the displaceability of the roof cap relative to the lateral folding top frame in the x-direction, that is, in the longitudinal direction of the vehicle, lever arms are achieved which are favorable for the last closing movement. Thereby, low closing forces are achieved. Thus, the problem existing in the case of prior opening and closing devices has been avoided which is that, in the closed position, these are in a dead-center position and therefore have problems with the application of forces from the drive.

According to the present invention, after the folding roof has been folded toward the front during the closing, the roof cap is now gripped in a forward position by the tensioning elements of the locking members. In a final step, an activation of the closing members arranged on the roof cap, then pulls the roof cap in the x-direction toward the front and is finally locked. No swivelling-in movement therefore exists of the forward roof part with the folding cover which frequently occurs in conventional arrangements, but there is only a linear displacement of the folding cover during the closing operation. If, for the opening of the folding roof, the locking is now opened up, simultaneously the fabric tensioning of the folding cover is also removed, whereby clearly lower forces are required for the further opening of the roof.

BRIEF DESCRIPTION OF THE DRAWINGS

Other objects, advantages and novel features of the present invention will become apparent from the following detailed description of the invention when considered in conjunction with the accompanying drawings wherein.

DETAILED DESCRIPTION OF THE DRAWINGS

The folding roof arrangement of the present invention basically operates in a known manner. For this reason, only the parts which are essential to the invention will be described in detail.

The folding roof arrangement has a folding cover 1 which is fastened on its forward end to a transversely extending roof cap 2. The folding cover 1 is guided in lateral folding top frames with lateral sealing rails 4 in the x-direction for opening and closing of the roof.

Figure 2:
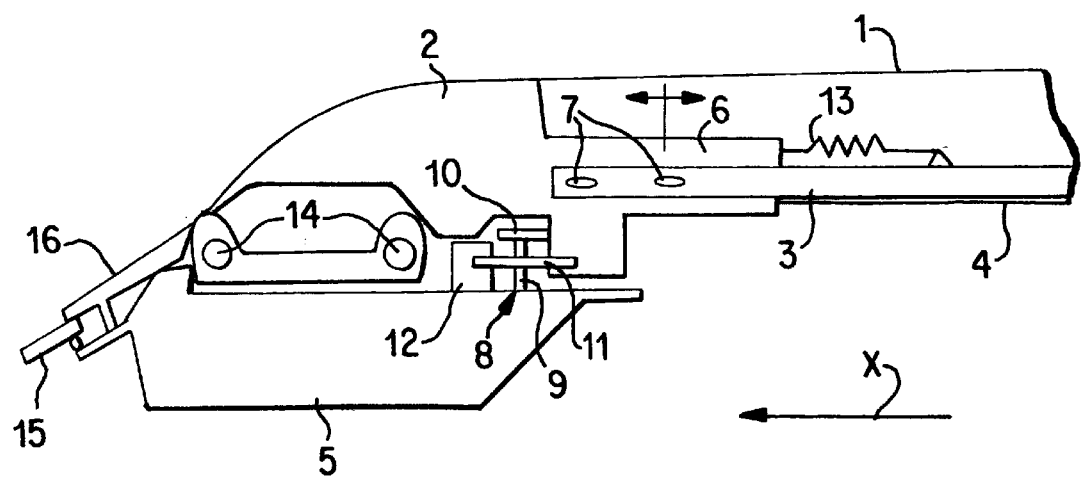
FIG. 2 is an enlarged schematic side view of the closing device of the folding roof in accordance with the present invention.

FIG. 2 is a schematic diagram of the locking arrangement of the folding roof on the vehicle body, specifically on the roof frame 5 with a wind screen cross member. On its rearward end, the roof cap 2 has longitudinal guides 6 on both sides which are each pushed over the lateral folding top frames 3. As the result thereof, the roof cap 2 can be displaced in the x-direction (see the arrows in FIG. 2) with respect to the lateral folding top frame 3 in conjunction with guide members which are guided in oblong holes 7.

The locking of the roof cap 2 with the roof frame 5 with a simultaneous tensioning of the folding cover by a movement of the roof cap 2 in the longitudinal guides 6 which correspondingly takes place in the x-direction toward the front can take place in an arbitrary manner. For this purpose, the locking device, which is described in WO 96/27509 (FIGS. 2 and 3) for example, can be used. For this reason, the locking system will be discussed only briefly in the following. As essential parts, the locking members 8 have a locking pin 9 which is fastened on the roof frame 5 and projects vertically upward therefrom, as well as a tensioning hooks 10 as a closing member which is arranged in a swivellably slidably movable manner on the roof cap 2. Furthermore, the locking members 8 laterally each also have a centering pin 11 which is arranged in the roof cap 2 and projects in the x-direction horizontally toward the front from the roof cap 2. The forward end of the lateral centering pins 11 is received for the centering in one receiving bore respectively of a receiving housing 12 connected with the roof frame 5. When the folding top is open, the roof cap 2 is held in a rearward position by a spring device 13 which can be fastened at one end to the folding top frame 3.

Figure 1:
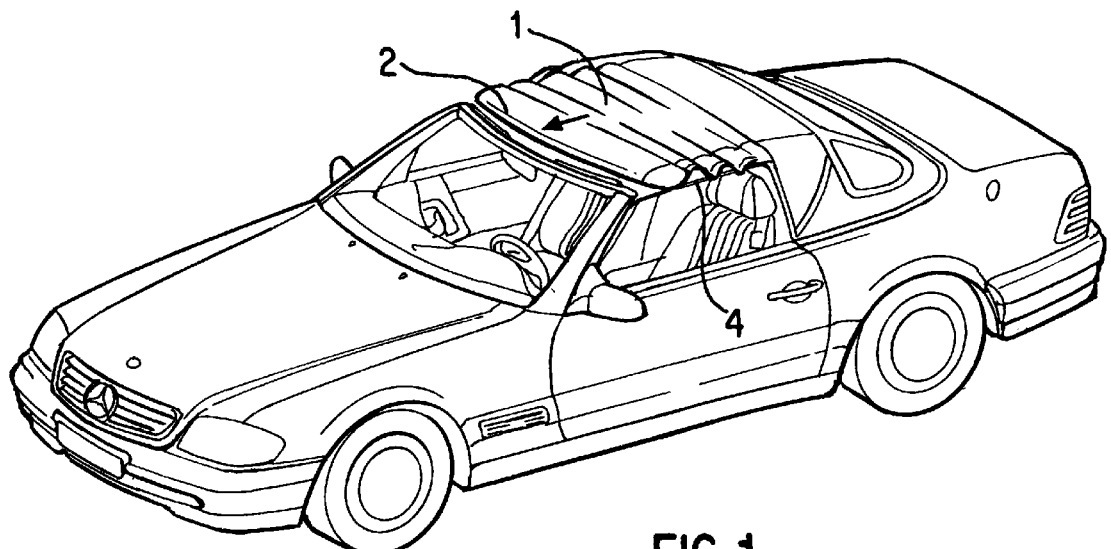
FIG. 1 is a perspective view of a vehicle with the folding roof arrangement according to the present invention.

When the folding top is closed, the roof cap 2. therefore first remains in this most rearward position; i.e., by a certain distance behind a locking position as seen in FIG. 1. In this position, the folding cover 1 is still relaxed. In this condition, the folding cover 1 can be relaxed to a first hoop (not shown) or may be completely relaxed. In this relaxed position, the tensioning hooks 10 are now applied to the locking pins 9 of the roof frame 5 and, when they are swivelled, pull the roof cap 2 and thus also the folding cover 1 into the forward end position. Simultaneously, together with the tensioning of the folding cover 1, the locking of the folding top also takes place. In this condition, the roof cap 2 carries out a relative movement against the force of the spring device 13 in the x direction toward the front with respect to the lateral folding top frame 3. The lateral sealing rails 4, which are fixedly connected with the folding top frame 3, are therefore not affected by the movement of the roof cap 2. In addition, on the vehicle body side, a stationary sealing device 14 is provided on the roof frame 5 for sealing off the roof cap 2 with respect to the roof frame 5 and a decorative rod 16 arranged above a windshield 15.

For opening the folding top, the tensioning hooks 10 of the locking members 8 are swivelled in the opposite direction. In this manner, the folding cover 1 is relaxed, whereby the roof cap 2 is pulled into the rearward position by the spring device 13. Subsequently, the folding cover 1 can be pulled by low forces toward the rear in the. lateral folding top frame 3.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A folding roof arrangement for a motor vehicle, comprising a folding cover having a forward end fastened to a transversely extending roof cap which is lockable on a body of the motor vehicle by locking members with a closed roof, and lateral folding top frames with which the roof cap is displaceably connected, wherein the, and the locking members comprise closing members arranged on the roof cap, the closing members being applied to tensioning elements adapted to be arranged on the motor vehicle body and displace the roof cap in a longitudinal direction of the motor vehicle toward the front relative to the lateral folding top frames into a locking end position.

2. The folding roof arrangement according to claim 1, wherein the roof cap is operatively connected by longitudinal guides with the lateral folding top frames.

3. The folding roof arrangement according to claim 1, wherein a spring device is operatively arranged between the roof cap and the folding top frames.

4. The folding roof arrangement according to claim 3, wherein the roof cap is operatively connected by longitudinal guides with the lateral folding top frames.

5. The folding roof arrangement according to claim 1, wherein the closing members are tensioning hooks arranged on the roof cap and engagable in locking pins comprising the tensioning elements.

6. The folding roof arrangement according to claim 5, wherein the roof cap is operatively connected by longitudinal guides with the lateral folding top frames.

7. The folding roof arrangement according to claim 6, wherein a spring device is operatively arranged between the roof cap and the folding top frames.

8. The folding roof arrangement according to claim 1, wherein the roof cap includes centering members for positioning the roof cap with respect to the roof frame.

9. The folding roof arrangement according to claim 8, wherein the roof cap is operatively connected by longitudinal guides with the lateral folding top frames.

10. The folding roof arrangement according to claim 9, wherein a spring device is operatively arranged between the roof cap and the folding top frames.

11. The folding roof arrangement according to claim 10, wherein the closing members are tensioning hooks arranged on the roof cap and engagable in locking pins comprising the tensioning elements.

* * * * *